United States Patent [19]
King

[11] 3,872,477
[45] Mar. 18, 1975

[54] DIRECTION FINDING TECHNIQUES EMPLOYING ELECTRONIC PHASE MODULATION

[75] Inventor: John P. King, Mountain View, Calif.

[73] Assignee: ESL Incorporated, Sunnyvale, Calif.

[22] Filed: July 19, 1972

[21] Appl. No.: 273,151

[52] U.S. Cl. .............................. 343/120, 343/113 R
[51] Int. Cl. ........................... G01s 3/02, G01s 5/04
[58] Field of Search ....................... 343/113 R, 120

[56] References Cited
UNITED STATES PATENTS

| | | | |
|---|---|---|---|
| 2,841,787 | 7/1958 | Knott | 343/120 |
| 3,050,727 | 8/1962 | Hansel et al. | 343/120 |
| 3,068,474 | 12/1962 | Higgins et al. | 343/113 R |
| 3,245,079 | 4/1966 | Stover | 343/113 R |
| 3,392,391 | 7/1968 | Royal | 343/113 R |
| 3,594,638 | 7/1971 | Quint | 343/113 R |
| 3,665,380 | 5/1972 | Stover | 343/113 R |

FOREIGN PATENTS OR APPLICATIONS

| | | | |
|---|---|---|---|
| 1,273,014 | 9/1966 | Germany | 343/113 R |

Primary Examiner—Maynard R. Wilbur
Assistant Examiner—T. M. Blum
Attorney, Agent, or Firm—Limbach, Limbach & Sutton

[57] ABSTRACT

Radio frequency signals received by two antennas positioned a fixed distance apart are combined into a composite electrical signal that is modulated according to the phase difference between the signals developed at each of the two antennas. A technique of forming a composite signal that is phase modulated by switching between the two antenna signals at an audio rate is disclosed. Alternatively, a phase modulated composite signal is formed by balance modulating at a constant frequency the signal from one antenna, shifting its phase, and adding the modulated signal to the signal from the other antenna. A radio receiver demodulates the composite signal and forms an audio tone whose magnitude and sense is proportional to the bearing angle of a particular radio signal of interest with respect to the two antennas.

23 Claims, 6 Drawing Figures

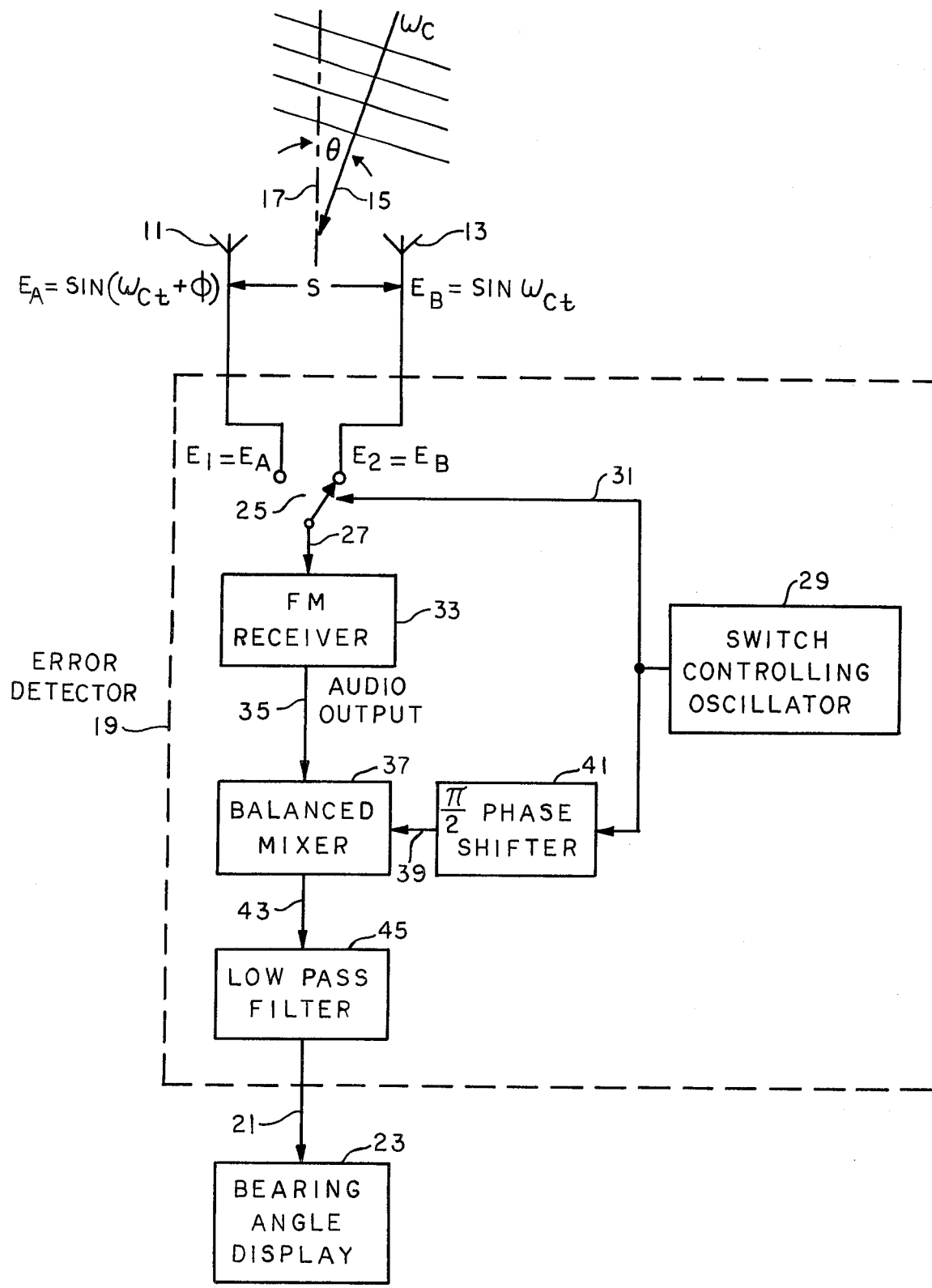
FIG-1-

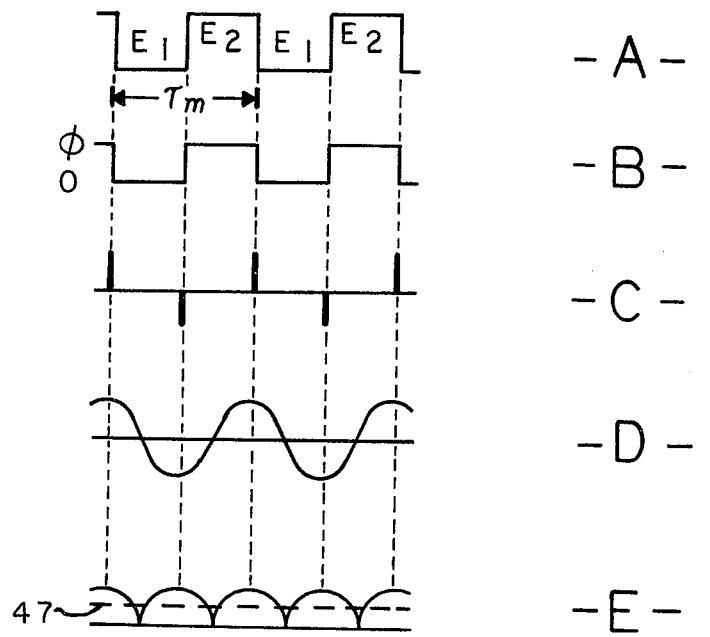
FIG -2-
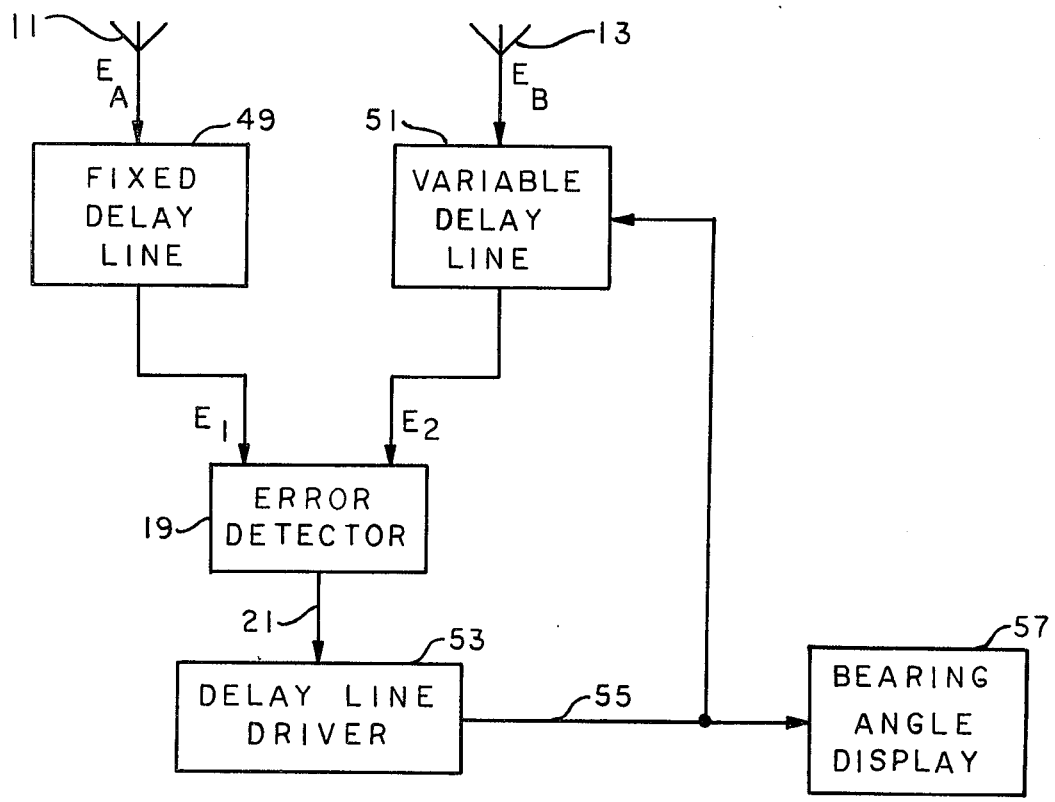
FIG -3-

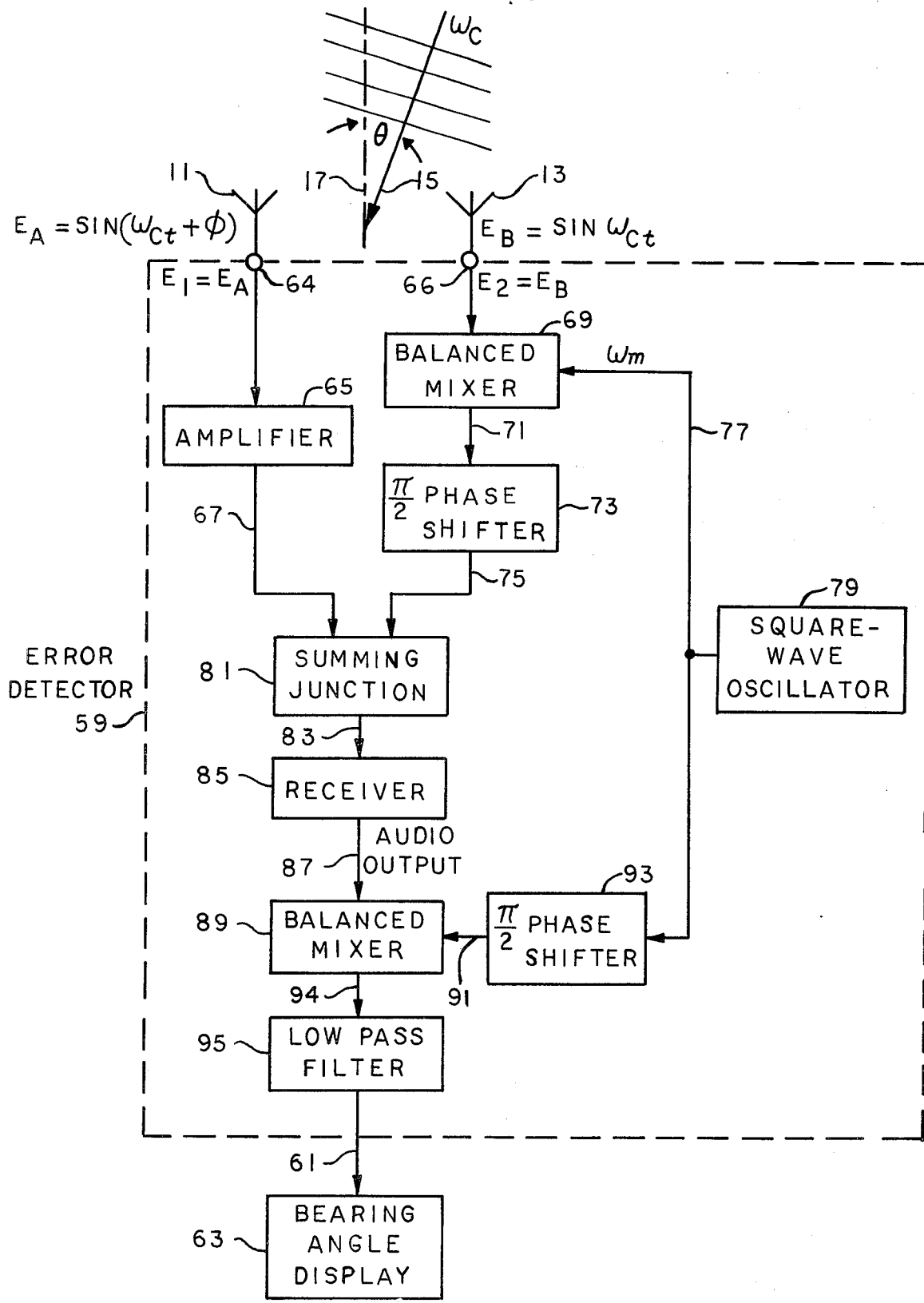
FIG — 4 —

-A- 
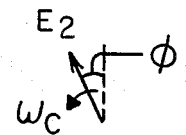 -B-
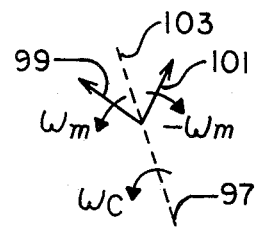 -D-
-C-
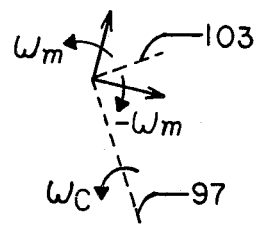 -E-
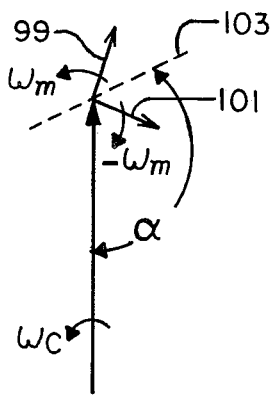
-F-
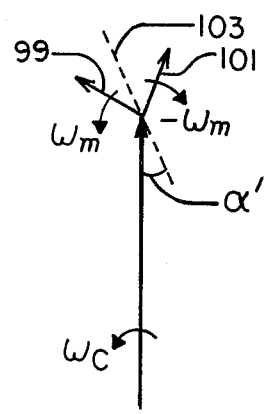 -G-
FIG -5-
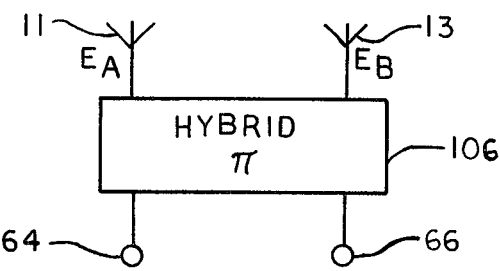
FIG -6-

DIRECTION FINDING TECHNIQUES EMPLOYING ELECTRONIC PHASE MODULATION

CROSS-REFERENCE TO A RELATED APPLICATION

This application is related to co-pending patent application Ser. No. 246,536, filed on behalf of Dale C. Lindley on Apr. 24, 1972, now U.S. Pat. No. 3,806,937 issued Apr. 23, 1974.

BACKGROUND OF THE INVENTION

The present invention is related generally to direction finding systems and techniques and more specifically is related to systems for determining the bearing angle of a distant radio transmitter. The needs for determining the location of a radio transmitter are varied. A boat, for instance, may have an emergency constant frequency transmitter and search parties want to be able to pinpoint the transmitter's location in order to effect a rescue. As a navigation aid, radio transmitters are provided for boats and airplanes at selected locations and the boat or airplane carries equipment for determining the radio transmitter locations in order to determine its position relative to the surrounding land.

In general, the present technique for determining the bearing angle of a radio transmitter relative to an observer is to use the gain patterns of a rotating antenna or to measure the very small time difference between the arrival of a radio frequency wavefront from the transmitter at one antenna and its arrival at another antenna. With the time difference technique, the two antennas are held at the observing location a fixed distance from each other. The bearing angle of the radio wavefront relative to the two antennas is related to the measured time of arrival difference by an inverse sine function. If the relative phase difference between two electrical signals developed by the radio wavefront in the two antennas is known, a bearing angle may similarly be determined.

SUMMARY OF THE INVENTION

Briefly, the various aspects of the present invention include processing the two radio signals developed respectively from two antennas as a fixed distance apart to form a single composite electrical signal that is phase modulated to a degree that is proportional to the phase difference between the two radio siganls developed by the antennas.

The development of a single composite signal permits direction finding equipment according to the present invention to be a simple add-on device to an available ordinary radio receiver. The radio receiver receives a composite signal and emits an audio tone whose magnitude is proportional to the magnitude of modulation in the composite signal. Phase modulation is detected by the use of a frequency modulated receiver. Any amplitude modulation component resulting from phase modulation of the composite signal is detected by the use of an amplitude modulated receiver. The modulating signal used in developing the phase modulated composite signal is of a fixed frequency within the audio range capability of the receiver used. The frequency of the tone developed at the audio output of the receiver is determined by this modulating frequency.

This technique requires only one radio receiver to be used and permits in some circumstances the simultaneous monitoring of the informational content of a radio signal as the bearing angle of that radio signal relative to the two antennas is being determined.

The audio signal output of the receiver that is proportional to the bearing angle of the radio signal may be directly indicated by some convenient device. Alternatively, this signal may be utilized in a closed loop system for automatically adjusting relative time delays in the signal paths from the two antennas in order to eliminate or minimize the audio signal at all times. When the audio error signal is eliminated or minimized, the relative difference in time delays in the paths of the two signals from the two antennas indicates the difference in time of arrival of the radio signal of interest at the two antennas. From this time difference, the bearing angle of the radio signal can be calculated according to known methods. The closed loop arrangement has the advantage of automatic operation which drives the modulation of the composite signal to zero which thereby prevents intereference with the informational content of the radio signal. The existence of a strong audio tone at the output of the receiver may be desirable in some applications, however, such as part of a navigation aid wherein a boat or some other vehicle is indicated to be heading in a wrong direction when a tone is sounded.

Additional objects and advantages of the various techniques of the present invention will become apparent in the following detailed discussion of preferred embodiments thereof which should be taken in conjunction with the drawings.

BRIEF DESCRIPTION OF THE DRAWINGS

FIG. 1 is a block diagram of one embodiment of the present invention;

FIG. 2 is a timing diagram of the system of FIG. 1;

FIG. 3 shows additional elements which may be used in conjunction with the error detector of FIG. 1;

FIG. 4 is a block diagram of another embodiment of the present invention;

FIG. 5 illustrates vector diagrams at various points in the embodiment of FIG. 4; and FIG. 6 illustrates a variation of the embodiment of FIG. 4.

DESCRIPTION OF THE PREFERRED EMBODIMENTS

Referring to FIG. 1, a pair of antennas 11 and 13 are fixed relative to one another and separated a distance S. An electromagnetic energy wavefront 15 is propagating onto the antennas 11 and 13 at an angle $\theta$ with a line 17. The line 17 is perpendicular to a line joining the antennas 11 and 13. The wavefront 15 may be, for instance, within the radio frequency portion of the electromagnetic energy spectrum and has a carrier frequency of $\omega_r$. This carrier may be modulated with information or it may be unmodulated.

The angle $\theta$ of FIG. 1 is the bearing angle of that desired to be determined by the techniques and systems described in the present disclosure. The wavefront will strike the antennas 11 and 13 at different times unless the bearing angle $\theta$ is equal to 0. It is this difference in time of arrival of the wavefront at the two antennas 11 and 13 that may be determined directly by the electronic equipment since this time difference is proportional to the bearing angle $\theta$ by an arc sine function. The signal received by the antenna 11 is denoted as $E_A$ while the signal received by the antenna 13 is represented as $E_B$. Both of the signals $E_A$ and $E_B$ are time varying electrical signals of a carrier frequency $\omega_c$ and additionally are out of phase from each other by a phase angle $\phi$. This phase angle $\phi$ is also proportional to the magnitude of the bearing angle $\theta$. If the bearing angle $\theta$ is 0, the voltages $E_A$ and $E_B$ will be in phase and the phase angle $\phi$ will therefore be equal to 0. The determination of the phase difference $\phi$ between the voltages $E_A$ and $E_B$ by electronic equipment also permits the determination therefrom of the desired ultimate quantity, the bearing angle $\theta$.

The signals $E_A$ and $E_B$ from the antennas 11 and 13 are applied to an error detector circuit 19 as signals $E_1$ and $E_2$, respectively, to develop an error signal in a line 21 at the output of the error detector 19 that is proportional to the phase difference $\phi$ between the signals $E_1$ and $E_2$. The error signal in the line 21 is applied to some appropriate bearing angle display device 23 which may be adjusted to respond to the error signal 21 and to display the bearing angle $\theta$ directly.

The error detector 19 includes a switch 25 which alternately connects a line 27 between the signals $E_1$ and $E_2$ of the antennas 11 and 13. The switch 25 is preferably a semi-conductor circuit that is driven by a squarewave oscillator 29 whose output is connected to the switch 25 through a line 31. The composite signal in the line 27 is resultantly one that has a basic carrier frequency $\omega_c$ of the electromagnetic energy wavefront 15 being received plus whatever information may be modulated onto the carrier of the signal 15. In addition, the switch 25 superimposes a phase modulation onto the signal. The result is a composite signal in the line 27 that suddenly shifts relative phase as the switch 25 is operated to change between the voltages $E_1$ and $E_2$. It is the magnitude of this sudden shift in phase, which is equal to the phase angle $\phi$, that is detected for development of the error signal in the line 21. The switch 25 has thus formed a single phase modulated signal in the line 27.

The composite signal in the line 27 is connected with an antenna terminal of an F.M. rerceiver 33 whose audio output is connected by a line 35 to a balanced mixer 37. The balanced mixer 37 also receives a squarewave signal in a line 39 from the output of the squarewave oscillator 29 after passing through a phase delay network 41 which shifts the phase of the squarewave oscillator output by 90° before it is applied through the line 39 to the balanced mixer 37. An output line 43 of the balanced mixer 37 contains a demodulated error signal which is passed through a low pass filter 45 to present an error signal in the line 21 which is representative of the bearing angle $\theta$.

The F.M. receiver 33 can be any standard receiver to which the remaining elements of FIG. 1 are simply added on. There will be, of course, a number of signals developed in the lines from the antennas 11 and 13 since they are receiving a wide number of electromagnetic energy wavefronts. The F.M. receiver 33 serves the function of selecting a signal frequency range to be examined. An operator simply dials the F.M. receiver 33 in the same manner as he would tune it absent any direction finding add-on equipment. The squarewave oscillator 29 has a frequency within the audio spectrum to which the F.M. receiver 33 responds, such as in the range of 300–2500 Hz., so that it will pass to its audio output line 35 a signal whose magnitude is proportional to the phase difference $\phi$ in the signals $E_1$ and $E_2$. The operator will hear a tone in the audio output 35 at the frequency of the squarewave oscillator 29. The louder the tone, the greater the bearing angle $\theta$. Simultaneously with taking a bearing angle reading of a wavefront, the operator may also listen to any frequency modulation information carried thereon so long as the audio signal in the line 35 proportional to the bearing angle $\theta$ is not so strong as to drown out such information.

Referring to FIG. 2, a timing diagram for operation of the circuit of FIG. 1 is illustrated. FIG. 2a illustrates a squarewave output of the oscillator 29 which alternately switches the line 27 through the switch 25 to the signals $E_1$ and $E_2$ to form a composite phase modulated signal. The period of the squarewave oscillator 29, as shown in FIG. 2a, is $\tau_m$, a period that is within the audio range response of the F.M. receiver 33 of FIG. 1.

FIG. 2b indicates the phase modulation that is superimposed onto the electromagnetic energy signal to form a composite phase modulated signal in the line 27 of FIG. 1. The composite signal in the line 27 abruptly changes relative phase by an amount $\phi$ when the switch 25 is operated. Since the F.M. receiver 33 of FIG. 1 is a differentiating device, the audio output 35 contains voltage spikes as indicated in FIG. 2c, one spike occurring each time the relative phase of the composite signal 27 is abruptly changed. The receiver 33 has demodulated this phase modulation. FIG. 2d shows a fundamental component of the spike voltage waveform of FIG. 2c which is of interest and later detected to form the error signal in the line 21 of FIG. 1. The higher frequency components of the signal represented in FIG. 2c are suppressed by the F.M. receiver itself and additionally by the balanced mixer 37.

The signal in the output line 43 of the balanced mixer 37 of FIG. 1 is shown in FIG. 2e wherein a pulsating direct current voltage is presented having an r.m.s. value indicated by the dashed line 47 of FIG. 2e. The magnitude of this r.m.s. voltage is the error signal in the line 21 that is measured by the bearing angle display device 23. Appropriate weighting may be applied to the display device 23 to display the bearing angle $\theta$ directly or a chart may accompany a direct reading of the voltage 47 in the line 21 so that an operator may convert such a voltage to the bearing angle $\theta$.

Referring to FIG. 3, an automatic closed loop direction finding system is shown wherein the signals $E_A$ and $E_B$ from the antennas 11 and 13 are individually delayed prior to being applied as signals $E_1$ and $E_2$, respectively, to the error detector 19. A delay line 49 having a fixed period of delay receives the signal $E_A$ from the antenna 11 and emits a delayed signal $E_1$ which is applied to the switch 25 of the error detector 19. A variable time delay line 51 receives the signal $E_B$ from the antenna 13 and applies a delayed signal $E_2$ to the switch 25 of the error detector 19. The error signal output in the line 21, rather than being read directly, is applied to a delay line driver circuit 53 which emits a signal in a line 55 that is connected with the variable delay line 51 in a manner to adjust the delay time thereof to minimize the error signal in the line 21. A bearing angle display device 57 receives the feedback signal in the line 55 which indicates the instantaneous differences in time delay of the delay lines 49 and 51 and thus indicates a quantity from which the bearing angle $\theta$ may be computed. Alternatively, the bearing angle display device 57 may include electronic components to convert the feedback signal in the line 55 for displaying bearing angle directly.

The variable delay line 51 may include a plurality of delay lines of different lengths that may be selectively switched by a signal in the line 55 in a binary manner until the error signal in the line 21 is driven to zero or a minimum. Such a delay line is shown and described with respect to FIG. 7 of aforementioned co-pending application, Ser. No. 246,536. As described in that application, the delay line driver 53 may be a binary up/down counter which generates a binary count in the line 55 proportional to the analog voltage level of the error signal in the line 21. Whatever specific components are used to implement the closed loop system illustrated in FIG. 3, there are certain advantages over the loop system of FIG. 1. Since the system of FIG. 3 is operating to minimize the error signal in the line 21, there will not be a tone in the audio output of the F.M. receiver 33 of the error detector 19 which will interfere with the operator's listening to information on the ratio wave being monitored. Furthermore, the system of FIG. 3 is automatic. When the error signal is eliminated or minimized at the output line 21, this indicates that the signals $E_1$ and $E_2$ at the outputs of the two delay lines are in phase.

Referring to FIG. 4, a second specific embodiment of the phase modulation techniques of the present invention is shown. The signals $E_1$ and $E_2$ from the antennas 11 and 13 are applied to terminals 64 and 66, respectively, of an error detector 59 which has an output line 61 in which an error signal having a magnitude proportional to the phase difference $\phi$ between the signals $E_1$ and $E_2$ is generated. The magnitude of this error voltage is displayed by a bearing angle display apparatus 63.

In processing the signals $E_1$ and $E_2$, the error detector 59 of FIg. 4 includes a "carrier leg" in which an amplifer 65 is positioned for receiving the signal $E_1$ and forming an amplified version thereof in a line 67. A "sideband leg" includes a balanced mixer 69 receiving the signal $E_2$. An output in the line 71 is passed through a phase shifting network 73 to form a modulated and phase shifted signal in a line 75. The balanced mixer 69 can be, for example, a hybrid $\pi$ network and switch. A modulating signal $\omega_m$ is applied to the mixer 69 through a line 77 from a squarewave oscillator 79.

The modulated signal in the line 75 of the sideband leg is added to the amplified carrier signal in the line 67 of the carrier leg by a summing circuit 81. The output of the summing circuit 81 in a line 83 is a composite signal of that being received at the antennas 11 and 13 that has been both phase and amplitude modulated, as is explained more fully hereinafter. Both the degree of phase and amplitude modulation may be detected independently of one another to determine the phase difference $\phi$ between the signals $E_1$ and $E_2$ developed by the antennas, and thus allow determination of the bearing angle $\theta$. The composite signal in the line 83 is applied to an antenna terminal of a receiver 85 which generates an audio signal in its audio output 87 whose magnitude is proportional to the phase difference $\phi$ in the signals $E_1$ and $E_2$. A modulating signal $\omega_m$ of the squarewave oscillator 79 is made to be within the audio range of the receiver 85, such as in the range of from 300–2500 Hz., so that such an audio error signal will pass through the receiver 85. The receiver 85 is chosen to be an F.M. receiver if it is desired to detect the amount of phase modulation in the composite signal in the line 83. Alternatively, the receiver 85 may be an A.M. receiver if the degree of amplitude modulation in the composite signal in the line 83 is to be detected. The choice of the receiver 85 may depend largely upon the type of modulation on the electromagnetic energy wave 15 that is being detected so that its information content may be simultaneously monitored as its direction is determined.

The audio output of the receiver 85 is applied by the line 87 to a balanced mixer 89 which may be, for example, a diode ring mixer. A squarewave from the squarewave oscillator 79 is also applied to the mixer 89 through a line 91 after having been phase delayed by 90° by a phase shifting network 93. An output of the balanced mixed in a line 94 is filtered by a low pass filter 95 whose output is the line 61 in which the desired error signal occurs whose magnitude is proportional to the phase difference $\phi$ between the signals $E_1$ and $E_2$.

It will be noted that the embodiment of FIG. 4 has certain advantages over the embodiment of FIG. 1. An important advantage is that the error signal is being determined instantaneously in the system of FIG. 4 while the switching phase modulation system of FIG. 1 compares the two antenna signals at different periods of time. The continuous comparison system of FIG. 4 is thus preferred in certain embodiments. This advantage is especially evident when the error detector 59 of FIG. 4 is substituted for the error detector 19 of FIG. 3. When such a closed loop system is formed with the error detector 59, the phase shifting network 73 is generally omitted and the output of the balanced mixer 69 is applied directly to the summing junction 81.

The operation of the error detector 59 of FIG. 4 can be best understood with reference to the vector diagrams of FIG. 5. FIG. 5a shows a vector representation of the voltage $E_1$ which, for convenience, is maintained in a vertical reference position. FIg. 5b shows the vector of the voltage $E_2$ which is leading the voltage $E_1$ by a phase difference $\phi$. Both vectors $E_1$ and $E_2$ of FIG. 5a and 5b are rotating at the carrier frequency of the radio signal of interest, $\omega_c$. This particular frequency is selected from all of those present at the antennas 11 and 13 by appropriate tuning of the receiver 85 of FIG. 4.

FIG. 5c shows the amplified signal in the line 67 that is applied to the summing junction 81 from the carrier leg. FIG. 5d shows the output of the balanced mixer 69 in the line 71 wherein sideband signals 99 and 101 are rotating with respect to an imaginary carrier reference line 97 at $+\omega_m$ and $-\omega_m$, respectively, wherein $\omega_m$ is the squarewave frequency of the modulating signal in the line 77 and is within the audio range of the receiver 85. A resultant vector of the sideband vectors 99 and 101 of FIG. 5d lies along a line 103 which is coincident with the imaginary carrier reference 97. No carrier component exists in the output line 71 of the balanced mixer 69.

The phase shifting network 73 shifts the signal indicated in FIG. 5d by a relative phase amount of 90° as shown in FIG. 5e which is a representation of the signal in the line 75 that is applied to the summing junction 81 from the sideband leg.

The vector diagram of FIG. 5f represents a composite signal in the line 83 which is the addition of the signals shown in FIGS. 5c and 5e. Since a good approximation of a phase modulated signal is desired, the sideband energy is kept low with respect to the carrier energy. The resultant 103 of the sideband signals 99 and 101 forms an angle α with respect to the amplified carrier term. It will be noted from FIG. 5f that when the angle α is equal to 90°, the composite signal is a pure phase modulated one so that if the receiver 85 of FIG. 4 is an F.M. receiver, the audio output as a result of this modulation, and thus the error signal in the line 61, will be a maximum. Amplitude modulation of such a signal is at a minimum and thus if the receiver is the amplitude modulated type, its audio output and thus the error signal in the line 61 will be at a minimum when α = 90°. It will be recognized that when α of FIG. 5f is equal to 90°, the signals $E_1$ and $E_2$ are in phase and the bearing angle θ is equal to 0°. Conversely, it will be noted that when the angle α of FIG. 5f is equal to 180°, a pure A.M. composite signal is present, the situation for the bearing angle θ to equal 90°.

FIG. 5g shows a composite signal in the line 83 when the phase shifting network 73 of FIG. 4 is omitted. The composite signal of FIG. 5g is the addition of the amplified carrier signal of FIG. 5c plus the modulated signal of FIG. 5d. It will be recognized from the composite signal of FIG. 5g that for a frequency modulated receiver 85, the error signal output in the line 61 will be minimum when the bearing angle θ and 0 and a maximum when the bearing angle θ approaches 90°.

Additional details of phase modulation of a type employed in the embodiment of FIGs. 4 and 5 may be had by reference beginning at page 384 of a book by P. F. Panter, entitled, Modulation, Noise and Spectral Analysis, McGraw-Hill 1965. The known Armstrong method of phase modulation has been adapted as part of the present invention for a unique use in a direction finding system.

A variation in the embodiment of FIG. 4 is illustrated with respect to FIG. 6 wherein a beam forming network 106 in the form of hybrid π network is inserted between the antennas 11 and 13 and the terminals 64 and 66 to the error detector circuit 59 of FIG. 4. The signals $E_1$ and $E_2$ are now each a combination of both antenna signals $E_A$ and $E_B$, as shown in FIG. 6. The use of the hybrid 106 converts the system of FIG. 4 to what is commonly referred to as an "amplitude monopulse" system. The hybrid 106 allows the system of FIG. 4 to take advantage of amplitude monopoles. When the hybrid 106 is utilized, use of the phase shifter 73 is generally preferred.

The output signal from the receiver 85, when FIG. 4 is modified according to FIG. 6, is not dependent upon signal level at the antennas. Furthermore, the output signal retains the sense or direction of the bearing angle θ, an advantage over existing amplitude monopulse techniques. The systems described herein do not require a third channel to convey the sense of the bearing angle θ whose magnitude is being measured.

The invention has been described with respect to preferred embodiments thereof, but it will be understood that the invention is entitled to protection within the full scope of the appended claims.

I claim:

1. A method of determining a bearing signal of an electromagnetic energy wavefront relative to two receiving antennas, comprising the steps of:
    modulating an electrical signal from one of said antennas with a modulating signal of constant frequency in order to generate a pair of sidebands with carrier suppressed,
    adding the modulated signal to an electrical signal from the other of said antennas to form a composite signal, and
    generating an error signal proportional to the degree of phase or amplitude modulation of said composite signal and thereby also proportional to the bearing angle of said electromagnetic energy wavefront, said error signal generation including the steps of:
        applying the composite signal to an antenna input of a frequency modulation responsive radio receiver, thereby detecting the degree of phase modulation of said composite signal, and
        utilizing an audio output of said receiver for indicating the bearing angle.

2. A method of determining a bearing signal of an electromagnetic energy wavefront relative to two receiving antennas, comprising the steps of:
    modulating an electrical signal from one of said antennas with a modulating signal of constant frequency in order to generate a pair of sidebands with carrier suppressed,
    adding the modulated signal to an electrical signal from the other of said antennas to form a composite signal,
    generating an error signal proportional to the degree of phase or amplitude modulation of said composite signal and thereby also proportional to the bearing angle of said electromagnetic energy wavefront, and
    utilizing said error signal to automatically adjust in response to the error signal relative time delays in the paths of the electrical signals from the two antennas which minimizes siad error signal and thus which minimized the degree of phase modulation of the composite signal, whereby the difference in time delay interposed in the paths of the electrical signals from the two antennas is equal to a desired difference in time of arrival of the electromagnetic energy wavefront at said two antennas.

3. A system of developing a signal proportional to the phase difference between first and second electrical signals developed by two antennas that are positioned a fixed distance apart, comprising:
    means receiving said first signal for amplifying said first signal,
    a constant frequency oscillator within the audio range,
    modulating means receiving said second signal and an output of said constant frequency oscillator for developing a double sideband suppressed carrier signal at an output,
    means for adding the amplified first signal and the modulating means output signal to form a composite signal that may be applied to a radio receiver antenna terminal, and
    means adapted to receive an audio output of the radio receiver for developing an error signal whose magnitude is proportional to the phase difference between said first and second electrical signals.

4. A system according to claim 3 wherein a phase shifting network is disposed between said modulating means and said adding means.

5. A system according to claim 3 wherein said constant frequency oscillator is a squarewave oscillator having a frequency within the range of about 300–2500 Hz.

6. A system according to claim 3 which includes a F.M. radio receiver having antenna terminals receiving the composite signal and an audio output connected to said error signal developing means, whereby the degree of phase modulation of the composite signal is detected and presented at the audio output of said receiver.

7. A system according to claim 3 which includes an A.M. radio receiver having antenna terminals receiving said composite signal and an audio output connected to said error signal developing means, whereby the degree of amplitude modulation of said composite signal is detected by the receiver and presented at its audio output.

8. A system according to claim 3 which additionally comprises a beam forming network connected to receive signals from the two antennas at its input and to develop said first and second signals at its output, said first and second signals being different combinations of the signals from both of the two antennas.

9. A system according to claim 6 wherein said modulating means output signal is applied to the adding means without any significant phase shifting of said modulating means output signal.

10. A system according to claim 7 which additionally comprises phase shifting means disposed between said modulating means output and said adding means for shifting the modulating means output signal substantially ninety degrees before being added to the amplified first signal.

11. A system according to claim 8 wherein said beam forming network is a hybrid $\pi$ network.

12. A method of determining a bearing signal of an electromagnetic energy wavefront relative to two receiving antennas, comprising the steps of:
  modulating an electrical signal from one of said antennas with a modulating signal of constant frequency in order to generate a pair of sidebands with carrier suppressed,
  adding the modulated signal to an electrical signal from the other of said antennas to form a composite signal, and
  generating an error signal proportional to the degree of phase or amplitude modulation of said composite signal and thereby also proportional to the bearing angle of said electromagnetic energy wavefront, said error signal generation including the steps of:
    applying the composite signal of an antenna input of an amplitude modulation responsive radio receiver, thereby detecting the degree of amplitude modulation of said composite signal, and
    utilizing an audio output of said receiver for indicating the bearing angle.

13. A system for determining a bearing angle of an electromagnetic wavefront relative to two antennas, comprising:
  means including a beam forming network for receiving signals from said two antennas and for producing first and second output signals that are different combinations of the signals from both of said two antennas,
  an oscillator,
  a modulating means receiving said first network output signal and an output of said oscillator for developing a double sideband suppressed carrier signal at an output,
  means receiving said modulating means output and said second network output signal for summing into a composite signal, whereby said composite signal is both phase and amplitude modulated in degrees proportional to said wavefront bearing angle to be determined.

14. A system according to claim 13 wherein said beam forming network includes a hybrid $\pi$ network.

15. A system for determining a bearing angle of an electromagnetic wavefront relative to an observer, comprising:
  first and second antennas,
  an audio frequency oscillator,
  modulating means receiving a signal from one of said antennas and an output of said audio frequency oscillator for developing a double sideband suppressed carrier signal at an output thereof,
  means receiving the modulating means output and a signal derived from the other of said antennas for summing the received signals together to form a composite signal, whereby said composite signal is both phase and amplitude modulated to a degree proportional to said wavefront bearing angle to be determined,
  an amplitude modulation responsive receiver having an antenna terminal connected to receive said composite signal, whereby an audio output of said receiver contains a signal proportional to the bearing angle of interest, and
  a phase shifting network disposed between said modulating means output and said summing means for shifting the phase of said modulating means output signal substantially ninety degrees before it is applied to said summing means.

16. A system for determining a bearing angle of an electromagnetic wavefront relative to an observer, comprising:
  first and second antennas,
  an audio frequency oscillator,
  modulating means receiving a signal from one of said antennas and an output of said audio frequency oscillator for developing a double sideband suppressed carrier signal at an output thereof,
  means receiving the modulating means output and a signal derived from the other of said antennas for summing the received signals together to form a composite signal, whereby said composite signal is both phase and amplitude modulated to a degree proportional to said wavefront bearing angle to be determined, and
  a frequency modulation responsive receiver with an antenna terminal connected to receive said composite signal, whereby an audio output of said receiver contains a signal proportional to the bearing angle of interest.

17. The system according to claim 16 wherein there is substantially zero relative phase shift of the modulating means output signal before it is applied to said summing means.

18. A system for determining a bearing angle of an electromagnetic wavefront relative to an observer, comprising:
  first and second antennas,
  an audio frequency oscillator,
  modulating means receiving a signal from one of said antennas and an output of said audio frequency oscillator for developing a double sideband suppressed carrier signal at an output thereof, means receiving the modulating means output and a signal derived from the other of said antennas for summing the received signals together to form a composite signal, whereby said composite signal is both phase and amplitude modulated to a degree proportional to said wavefront bearing angle to be determined, a radio receiver having an antenna terminal that is connected to receive said composite signal, and a demodulator connected to an audio output of said receiver, said demodulator being driven from said audio frequency oscillator, whereby said demodulator forms a direct current output level proportional to the wavefront bearing angle of interest.

19. The system according to claim 18 which additionally comprises:

means in the path of said antenna signals for adjusting the relative phase therebetween in response to an input signal, and means receiving the direct current output error signal of said demodulating means for driving said relative phase control means in a manner to minimize said error signal.

20. A system for determining a bearing angle of an electromagnetic energy wavefront relative to an observer, comprising:

first and second antennas positioned a fixed distance apart, said antennas being responsive to said electromagnetic radiation to form electrical signals proportional thereto at their outputs, a beam forming network receiving the signals from said first and second antennas, said beam forming network being characterized by having first and second output signals that are different combinations of the signals from both of said first and second antennas, a modulator circuit receiving directly said first network output signal, said modulator characterized by developing at an output thereof a double sideband suppressed carrier signal, means receiving said modulator output without any significant phase shift and receiving said second network output signal for summing into a composite signal, and means receiving said composite signal for generating a signal proportional in level to the amount of phase modulation present in said composite signal, whereby said signal level is proportional to the bearing angle of an electromagnetic wavefront relative to said first and second antennas.

21. The system according to claim 20 where said phase modulation detector includes an FM receiver with its antenna terminal connected to receive said composite signal, thereby generating at an audio output thereof said signal level proportional to the bearing angle, said system additionally comprising means receiving the FM receiver audio output for indicating the bearing angle of said electromagnetic energy wavefront.

22. The system according to claim 21 wherein said modulator circuit includes an audio oscillator connected to modulate said first network output signal and wherein said bearing angle indicating means includes a demodulator connected to receive the audio output of said FM receiver, said demodulator being driven from said audio oscillator, whereby said demodulator forms a direct current output level proportional to the wavefront bearing angle of interest.

23. The system according to claim 20 which additionally comprises an amplifier connected to receive said second network output signal for forming an amplified version thereof, said amplified version being applied to said summing means.

* * * * *